United States Patent
Greiner

(10) Patent No.: US 6,676,181 B1
(45) Date of Patent: Jan. 13, 2004

(54) GRILL SPATULA

(76) Inventor: Robert P. Greiner, 5406 Manorfield Rd., Rockville, MD (US) 20853

( * ) Notice: Subject to any disclaimer, the term of this patent is extended or adjusted under 35 U.S.C. 154(b) by 0 days.

(21) Appl. No.: 10/270,500

(22) Filed: Oct. 16, 2002

(51) Int. Cl.[7] ............................. A47J 43/28; A47L 17/06
(52) U.S. Cl. ..................... 294/7; 15/236.06; 15/236.07; 15/236.09; 30/172
(58) Field of Search ............................... 294/7, 8, 9, 10, 294/55.5; 15/236.01, 236.05, 236.06, 236.07, 236.08, 236.09; 30/169, 172, 322

(56) References Cited

U.S. PATENT DOCUMENTS

| | | | | |
|---|---|---|---|---|
| 532,564 A | * | 1/1895 | Kelley | 119/627 |
| 2,747,911 A | * | 5/1956 | Kuever | 99/450 |
| 2,989,836 A | * | 6/1961 | Schaffer | 56/400.15 |
| 3,213,779 A | * | 10/1965 | First | 99/352 |
| 4,146,943 A | * | 4/1979 | Wertheimer et al. | 15/111 |
| 4,848,816 A | | 7/1989 | Anderson | |
| D324,747 S | * | 3/1992 | Rood | D32/46 |
| 5,255,406 A | | 10/1993 | Rood | |

* cited by examiner

*Primary Examiner*—Dean J. Kramer
(74) *Attorney, Agent, or Firm*—Stephen R. Greiner

(57) ABSTRACT

A spatula for removing stuck food items from charcoal grills and liquid propane gas grills. The spatula has a handle and several flexible tines joined thereto. Arc-shaped blades are joined to the free ends of the tines. The arc-shaped blades conform closely to the top and side surfaces of the food supporting rods of a typical grill. When the spatula is used, the blades are slid along the rods to cleanly shear stuck food items from the grill without compromising the integrity of the food item.

10 Claims, 1 Drawing Sheet

GRILL SPATULA

FIELD OF THE INVENTION

The present invention relates generally to hand implements and, more particularly, to scrapers with plural blades that are simultaneously usable.

BACKGROUND OF THE INVENTION

The outdoor grilling of hamburgers, chicken and fish is widely popular. Unfortunately, during grilling, these foods tend to soften somewhat and ooze downwardly between the closely spaced, horizontal rods that comprise a typical grill where they can adhere. So, when a conventional spatula is slid along the top of a grill to lift a stuck piece of food, a portion of the food is often sheared off and lost. Just as often, the grilled food is mangled and rendered less appealing to eat.

It is a common practice to squirt no-stick spray formulations on grills and to coat grilled food items with vegetable oil to prevent sticking. These practices are not always possible or desirable. For example, a no-stick spray can only be applied to a cold grill thereby making it difficult to correct a sticking problem while grilling is underway. Also, the coating of foods with oil is an unpleasant task that can compromise flavor. It is well known that oil tends to drip onto heat sources like burning charcoal and gas burners and, may, cause flare-ups that can burn a food item on a grill.

SUMMARY OF THE INVENTION

In light of the problems associated with the removal of cooked food items from a grill, it is a principal object of the invention to provide a spatula that can easily lift a food item that has oozed or sagged into the spaces between the supporting rods of a conventional grill and become adhered thereto. The spatula does not affect the integrity of the food item or require that the food item be punctured or pierced in any way to accomplish its lifting.

It is another object of the invention to provide a spatula of the type described that can be used by inexperienced chefs with minimal instruction or training. Furthermore, the spatula can perform its intended objects without the use of additional tools of any sort.

It is a further object of the invention to provide a spatula of the type described that can be used with grills of various makes, models and manufacturers. The spatula is also somewhat self-adjusting to accommodate imperfections in the grill with which it is used regardless of make, model or manufacturer.

It is an object of the invention to provide improved elements and arrangements thereof in a spatula for the purposes described which is lightweight in construction, inexpensive to manufacture, and dependable in use.

Briefly, the spatula in accordance with this invention achieves the intended objects by featuring a handle from which extend a number of flexible tines. The free ends of the tines carry arc-shaped blades that closely conform to the tops and sides of the food supporting rods comprising a conventional grill. In use, the blades slide along the supporting rods of a grill to cleanly shear a stuck food item from the grill without compromising the integrity of the food item.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
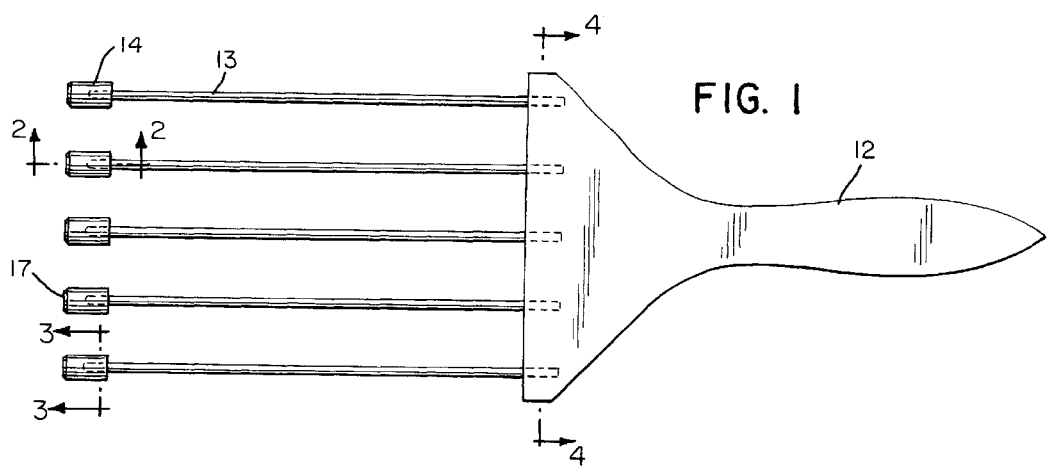
FIG. 1 is a plan view of the spatula of the present invention.
Figure 2:
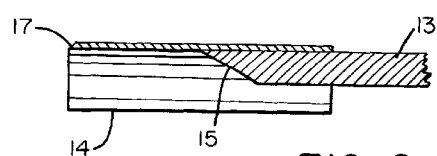
FIG. 2 is an enlarged sectional view of a blade along line 2—2 of FIG. 1, parallel to the longitudinal axis of a tine.
Figure 3:
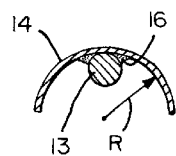
FIG. 3 is an enlarged sectional view of a blade along line 3—3 of FIG. 1, transverse to the longitudinal axis of a tine.
Figure 4:
FIG. 4 is a sectional view along the line 4—4 of FIG. 1, transverse to the longitudinal axes of the tines.
Figure 5:
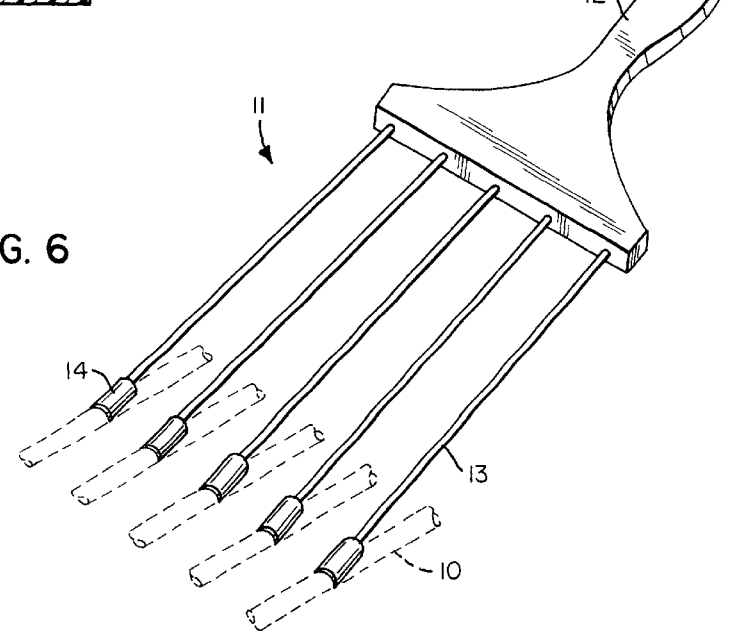
FIG. 5 is a prospective view of the spatula of the present invention.
Figure 6:
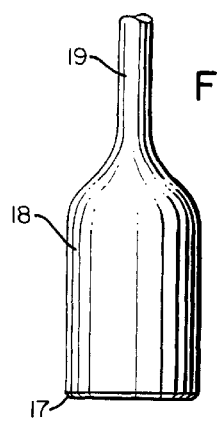
FIG. 6 is an enlarged plan view showing an embodiment of a blade integrally formed with a tine.

The grill spatula 11 is a specially designed for use with charcoal grills or liquid propane gas grills comprising a plurality of closely spaced, food-supporting, grill rods 10. Spatula 11 has a handle 12, a plurality of flexible tines 13, and a plurality of blades 14. Handle 12 may be formed of wood or other non-heat conductive material. Tines 13 are evenly spaced from one another and comprise a plurality of flexible, steel wires about ⅛ inch (3.175 mm) in diameter and 7 inches (17.78 cm) in length. Tines 13 are attached to handle 12 by integrally molding them therein or press-fitting them within drilled holes. Joined to tines 13 at their free ends are blades 14. Blades 14 are joined to tines 13 such as by welds 16. Blades 14 are formed in an arc shape by stamping them from sheets of metal like stainless steel. In FIG. 3 the arc-shape of a blade 14 may be seen to be a semi-circle with radius R. The radius R may vary depending on the radius of the rods 10 on which spatula 11 is used. The shape of the arc may vary also and, by way of example, be elliptical or parabolic, to conform closely to the top and side surfaces of rods 10 .with which spatula 11 is used. The free ends of blades 14 are chamfered or sharpened as at 17 to facilitate the cutting or shearing of a food item from rods 10 as blades 14 are slid along rods 10 and under the food item. The end of each tine 13 is chamfered at 15 to allow spatula 11 to be slid along rods 10 at a small acute angle relative to rods 10 to more easily cut or shear a food item from rods 10. In FIG. 6 may be seen a blade 18 that has been integrally formed on the free end of a tine, 19 by swaging tine 19. After blade 18 is provided with a shape like blade 14, it may be chamfered or sharpened as at 17 and used along with tine 19 in place of tine 13 and blade 14.

Use of spatula 11 to lift a food item that has become stuck to a grill is straightforward. First, blades 14 are positioned atop rods 10 adjacent the food item. Then, by gently pushing handle 12, blades 14 are slid along rods 10 toward the food item. As they pass beneath the food item, the chamfered portions 17 of blades 14 cleanly shear the food item from the grill. When the food item is located fully atop tines 13, the food item is lifted from the grill. The entire process can be accomplished with great ease and requires only a few seconds to complete. As blades 14 only engage the food item where the food item contacts rods 10, the integrity of the food item is never compromised. Because tines 13 are flexible, they allow blades 14 to shift from side-to-side as they are slid along rods 10 and under food items. This slight side-to-side movement of blades 14 compensates for slight manufacturing imperfections in the alignment of rods 10 or slight imperfections in the spacing between tines 13 so as to permit each blade 14 to always mate perfectly with a rod 10.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A spatula comprising:

a handle;

a plurality of flexible tines, each of said tines having an inner end joined to said handle and an outer end remote therefrom; and, a plurality of arc-shaped blades adapted to cup the food-supporting rods of a grill, each of said arc-shaped blades being rigidly affixed to said outer end of a respective one of said tines, and each of said arc-shaped blades having a chamfered free end being remote from said outer end of a respective one of said tines to which such is rigidly affixed.

2. A spatula for removing a stuck food item from a grill having spaced apart rods comprising:

a handle for hand grasping;

a plurality of flexible tines, one end of each of said tines being joined to said handle, said tines being parallel and spaced apart; and, a plurality of arc-shaped blades adapted to cup the food-supporting rods of a grill, each of said blades being rigidly affixed to a respective one of said tines, each of said arc-shaped blades having a chamfered free end being remote from said respective one of said tines to which such is rigidly affixed; wherein when sliding said arc-shaped blades along the grill rods, the stuck food item is cleanly sheared from the rods and simultaneously supported on said parallel tines.

3. The spatula of claim 2 wherein said handle is made of non-heat conductive material.

4. The spatula of claim 2 wherein said plurality of flexible tines are made of steel wire.

5. The spatula of claim 2 wherein said plurality of arc-shaped blades are made of stainless steel.

6. The spatula of claim 2 wherein said plurality of arc-shaped blades is joined to said plurality of tines by welding.

7. The spatula of claim 2 wherein said plurality of arc-shaped blades are integral with said plurality of tines and are formed by swaging the free ends of said tines.

8. The spatula of claim 2 wherein one end of each of said tines is integrally molded in said handle.

9. The spatula of claim 2 wherein the cross-section of each of said arc-shaped blades is semi-circular.

10. A spatula for removing stuck food items from a grill having spaced apart rods comprising:

a handle for hand grasping;

a plurality of flexible tines, one end of the each of said tines joined to set handle, said tines being parallel and spaced apart; and, a plurality of arc-shaped blades adapted to cup the spaced apart rods of the grill, each of said blades being rigidly affixed to a respective one of one of said tines, each of said arc-shaped blades having a chamfered free end being remote from said respective one of said tines to which such is rigidly affixed; wherein when sliding said arc-shaped blades along the grill rods, the stuck food item is cleanly sheared from the rods and simultaneously supported on said parallel tines, and wherein during the sliding movement of said blades along the rods, said flexible tines allow said blades to shift slightly in a side-to-side motion to compensate for slight manufacturing imperfections in the rods alignment and slight manufacturing imperfections in the spacing between said tines which thereby allows each said blade to always perfectly mate with the rods as said blades slide along the rods.

* * * * *